(12) United States Patent
Alameh et al.

(10) Patent No.: US 8,725,197 B2
(45) Date of Patent: May 13, 2014

(54) METHOD AND APPARATUS FOR CONTROLLING AN ELECTRONIC DEVICE

(75) Inventors: Rachid Mohsen Alameh, Crystal Lake, IL (US); William Paul Alberth, Jr., Prairie Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 124 days.

(21) Appl. No.: 13/324,560

(22) Filed: Dec. 13, 2011

(65) Prior Publication Data
US 2013/0150133 A1   Jun. 13, 2013

(51) Int. Cl.
*H04W 88/02* (2009.01)
*H04M 1/02* (2006.01)

(52) U.S. Cl.
USPC ........................... 455/550.1; 455/569.1

(58) Field of Classification Search
USPC .............. 455/550.1, 569.1, 556.1, 575.1
See application file for complete search history.

(56) References Cited

U.S. PATENT DOCUMENTS

| 6,853,850 | B2 | 2/2005 | Shim et al. |
| 2005/0219228 | A1 | 10/2005 | Alameh et al. |
| 2007/0036347 | A1* | 2/2007 | Teicher .................. 379/418 |
| 2008/0170749 | A1 | 7/2008 | Albertson et al. |
| 2010/0151916 | A1* | 6/2010 | Baek et al. .................. 455/567 |
| 2010/0234094 | A1 | 9/2010 | Gagner et al. |
| 2011/0003614 | A1* | 1/2011 | Langereis et al. ......... 455/550.1 |
| 2011/0312349 | A1* | 12/2011 | Forutanpour et al. ........ 455/466 |
| 2012/0157114 | A1* | 6/2012 | Alameh et al. ............. 455/456.1 |
| 2012/0295661 | A1* | 11/2012 | Kim et al. ................ 455/556.1 |

FOREIGN PATENT DOCUMENTS

JP   2007081460 A   *   3/2007

OTHER PUBLICATIONS

Bruce Howard et al., "Ubiquitous Computing Enabled by Optical Reflectance Controller", pp. 6, Virginia.

* cited by examiner

*Primary Examiner* — Blane J Jackson

(57) ABSTRACT

An apparatus and method of an electronic device for controlling the electronic device are disclosed herewith. The method includes determining that the electronic device is engaged in a voice call. The method further includes detecting at least one object that covers at least a predetermined portion of a mouthpiece area of the electronic device while the electronic device is engaged in the voice call. Furthermore, the method activates an electronic mute feature of the electronic device in response to detecting the at least one object.

16 Claims, 5 Drawing Sheets

METHOD AND APPARATUS FOR CONTROLLING AN ELECTRONIC DEVICE

FIELD OF THE DISCLOSURE

The present disclosure relates generally to an electronic device and more particularly to a method and apparatus for controlling the electronic device.

BACKGROUND

Electronic devices such as mobile phones, smart phones, wearable devices, and other handheld or portable electronic devices such as personal digital assistants (PDAs), audio players, headsets, etc. have become popular and ubiquitous. As more and more features have been added to such devices, there has been an increasing desire to equip them with input/output mechanisms that accommodate numerous user commands and/or react to numerous user behaviors. For example, many mobile devices are now equipped not only with various buttons and/or keypads, but also with other terminologies that are able to communicate to the electronic device a variety of instructions.

There is an opportunity to define simple, intuitive, practical, and effortless means to control the electronic device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
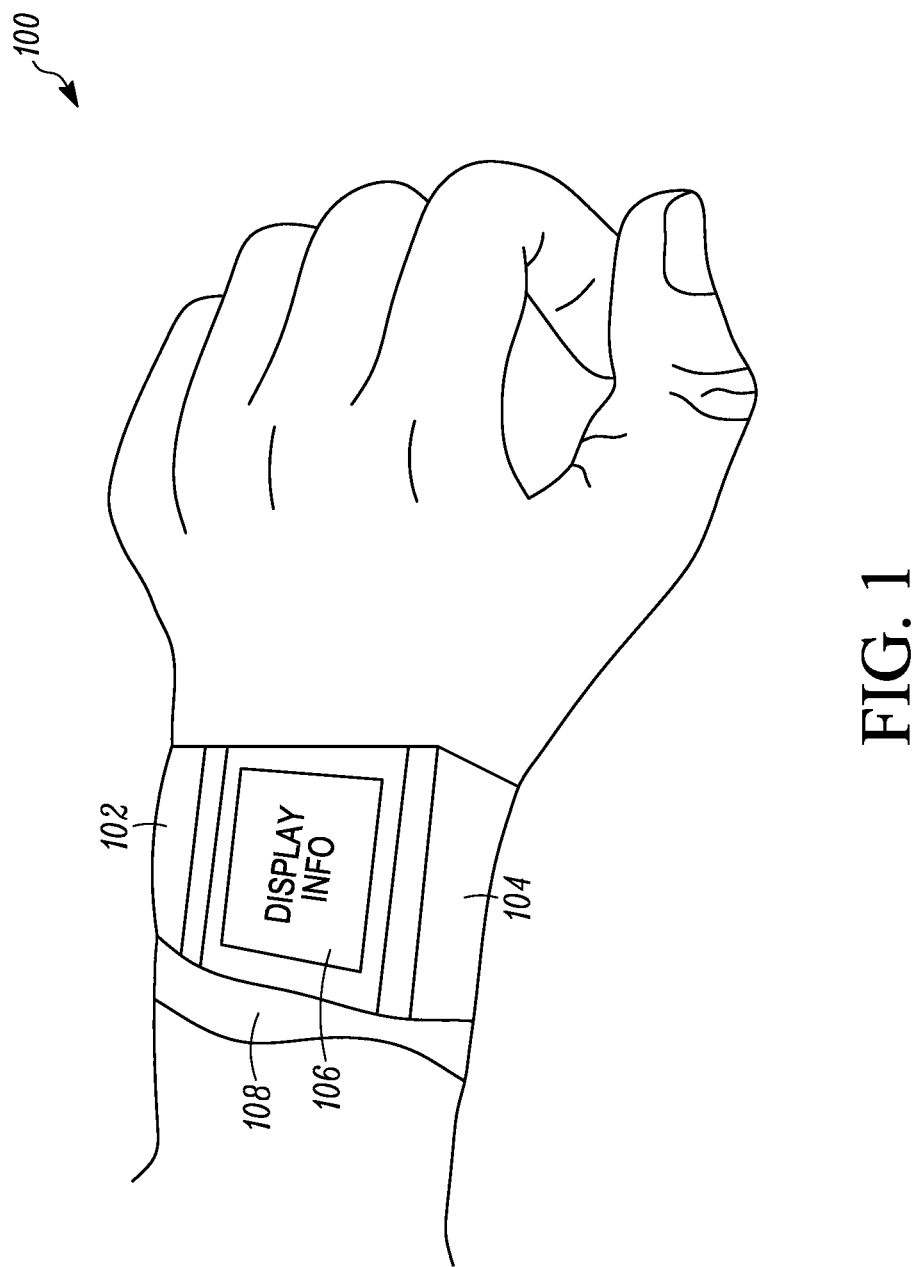
FIG. 1 is a schematic of an electronic device worn on a user's wrist in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail the particular method and system for controlling an electronic device, in accordance with an embodiment of the present disclosure, it should be observed that the present disclosure resides primarily in combinations of method steps and apparatus components related to the method and system for controlling an electronic device. More particularly, the present disclosure relates to controlling a call feature of the electronic device. Accordingly, the apparatus components and method steps have been represented where appropriate by conventional symbols in the drawings, showing only those specific details that are pertinent to understanding the present disclosure, so as not to obscure the disclosure with details that will be readily apparent to those of ordinary skill in the art, having the benefit of the description herein.

An apparatus and method for controlling the electronic device are disclosed herewith. The method includes determining that the electronic device is engaged in a voice call. The method further includes detecting at least one object that covers at least a predetermined portion of a mouthpiece area of the electronic device while the electronic device is engaged in the voice call. Furthermore, the method activates an electronic mute feature of the electronic device in response to detecting the at least one object.

In accordance with the embodiments of the present invention, an electronic mute feature of an electronic device gets activated by a hand gesture. More specifically, when the electronic device is engaged in a voice call and the electronic device detects that at least some portion of a mouthpiece area of the electronic device is covered by an object, for example, a cupped hand, the electronic mute feature of the electronic device gets activated. In one example, the mouthpiece of the electronic device, for example, a microphone gets momentarily disabled and the voice call is muted. In other words, during a voice call, the cupped hand over the mouthpiece or microphone area momentarily mutes the microphone.

FIG. 1 illustrates a schematic diagram 100 showing an example electronic device 102 worn on a user's wrist 108 in accordance with some embodiments of the present invention. It will be appreciated that, for this embodiment, the electronic device 102 may be worn on a user's wrist 108 or any other part of the user's body. The electronic device 102 includes a band 104 through which the electronic device 102 may be tied to user's wrist 108. The electronic device 102 includes a front surface 106 that may contain a display, a microphone, and/or other input/output components necessary for the operation of the electronic device 102.

In accordance with the embodiment, the electronic device 102 is intended to be representative of any of a variety of wireless communication devices operated by persons (or users) or possibly by other entities (e.g., other computers) desiring or requiring communication capabilities. In some embodiments, for example, the electronic device 102 can be any of a call receiver, cellular telephone, a personal digital assistant (PDAs), a smart phone, another handheld or portable electronic device, a headset, a MP3 player, a battery-powered device, a wearable device, a radio, a navigation device, a laptop or notebook computer, a notebook, a pager, a PMP (personal media player), a DVR (digital video recorder), a gaming device, a camera, a notebook, an e-reader, an e-book, a tablet device, a navigation device with a video capable screen, a multimedia docking station, or another mobile.

It should be appreciated that the electronic device 102 is configured to communicate with other electronic devices, base stations, and/or access points in a network which may operate according to any of a number of different communication technologies including, but not limited to, 2G, 3G and 4G wireless communication technologies. These technologies include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies, as well as ad hoc or peer-to-peer technologies, such as IEEE 802.11 Wi-Fi, Bluetooth, Near Field Communication (NFC), optical, sonic, and infrared-based technologies.

Further, it is to be understood that FIG. 1 is provided merely for the purpose of illustrating the principles of the present invention. FIG. 1 is not intended to be a comprehensive schematic diagram of all of the components of such an electronic device. Therefore, FIG. 1 may comprise various other configurations and still be within the scope of the present disclosure.

Figure 2:
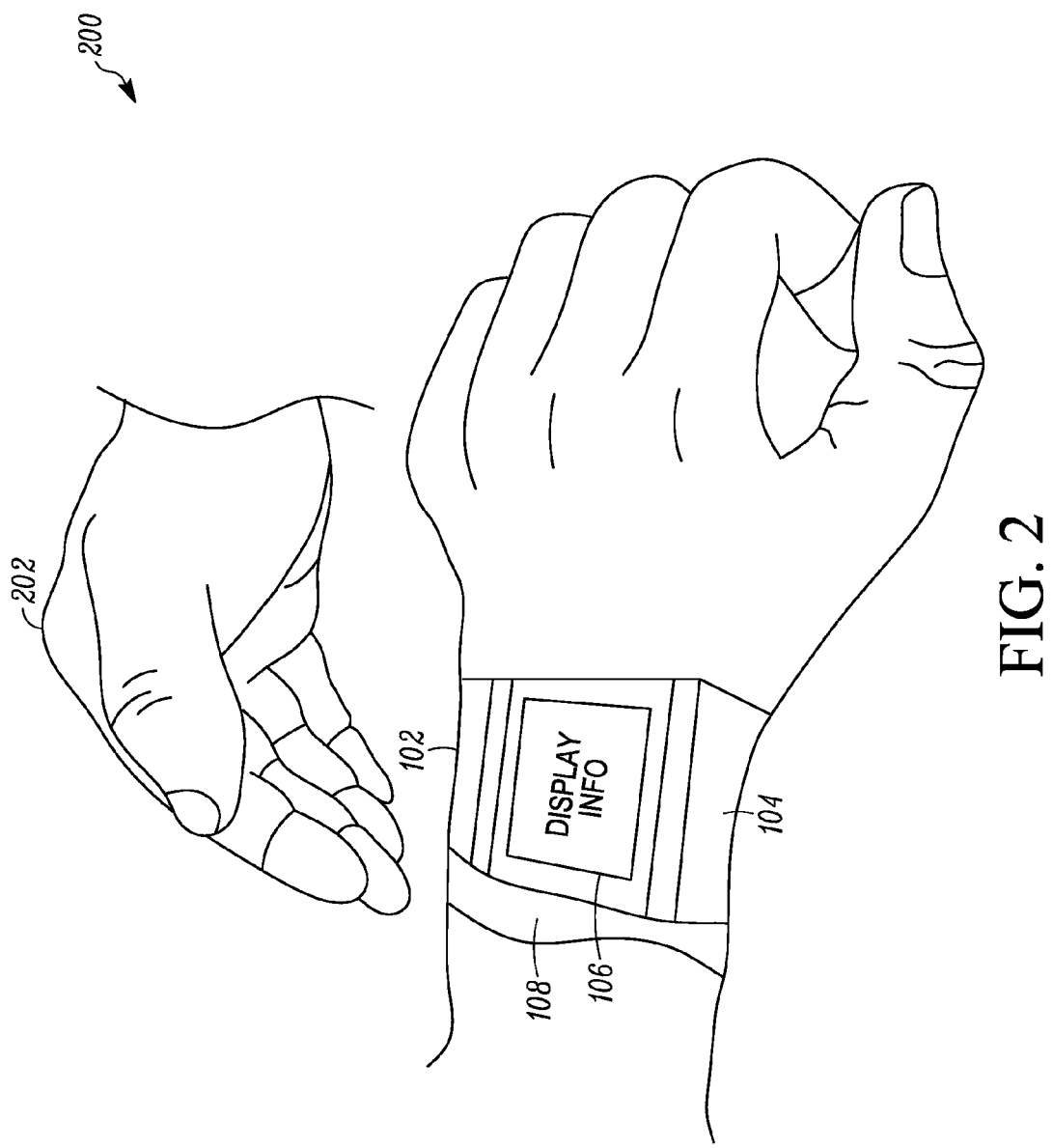
FIG. 2 is a schematic of an electronic device being covered by a cupped hand in accordance with some embodiments of the present invention.

FIG. 2 illustrates a view of an electronic device 102 being covered by a cupped hand 202. The cupped hand may represent an example of a hand gesture that activates an electronic mute feature of the electronic device 102. In FIG. 2, the cupped hand 202 substantially covers the entire front surface 106 of the electronic device 102 shown in FIG. 1.

In accordance with the embodiment, the electronic device 102 may be a wearable device which may be worn by a user of the electronic device 102. In one example, when the electronic device 102 is engaged in a voice call, the user of the electronic device 102 may wish to conduct a private conversation. The present invention activates an electronic mute feature of the electronic device 102 by a hand gesture, for example, a cupped hand. In case of the wearable device, which may be small in size, the user may not know where the mouthpiece would be exactly located. Thus, as shown in FIG. 2, the user covers the entire front surface of the electronic device 102 by positioning the cupped hand over the front surface of the electronic device 102. When the electronic device 102 is engaged in the voice call and a hand gesture, for example, the cupped hand is detected over at least some portion of the mouthpiece area, the electronic mute feature is activated. For example, the microphone may be momentarily disabled or muted. Thus, the user may be able to conduct a private conversation by muting the microphone with the help of hand gestures.

Figure 3:
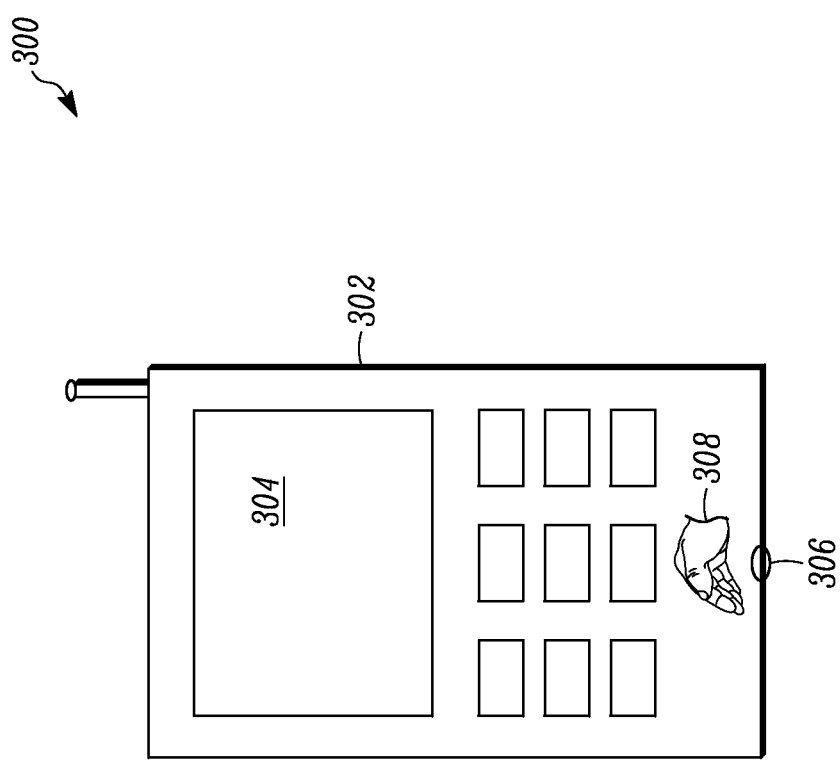
FIG. 3 is a schematic of an electronic device having some portion of the electronic device being covered by a cupped hand in accordance with some embodiments of the present invention.

FIG. 3 illustrates a schematic view of an electronic device 300 in accordance with some embodiments of the present invention. FIG. 3 illustrates a scenario when the various input components, for example, a microphone, may be easily identified by a user. Referring to FIG. 3, the exemplary components of the electronic device 300 include a housing 302, a display 304, a microphone 306, and a cupped hand 308.

As illustrated in the FIG. 3, the cupped hand 308 covers the microphone 306 of the electronic device 300. In accordance with the embodiments of the invention, when the electronic device 300 is engaged in a voice call, the user may wish to conduct a private conversation. The user utilizes a hand gesture to mute a mouthpiece, for example, a microphone 306. For example, as shown in FIG. 3, the user covers the microphone 306 of the electronic device 300 with a cupped hand 308. When the electronic device 300 is engaged in the voice call and an object, for example, a cupped hand is detected over at least some portion of the microphone 306, an electronic mute feature is activated. For example, the microphone 306 may be momentarily disabled or muted and the user may be able to conduct a private conversation.

Figure 4:
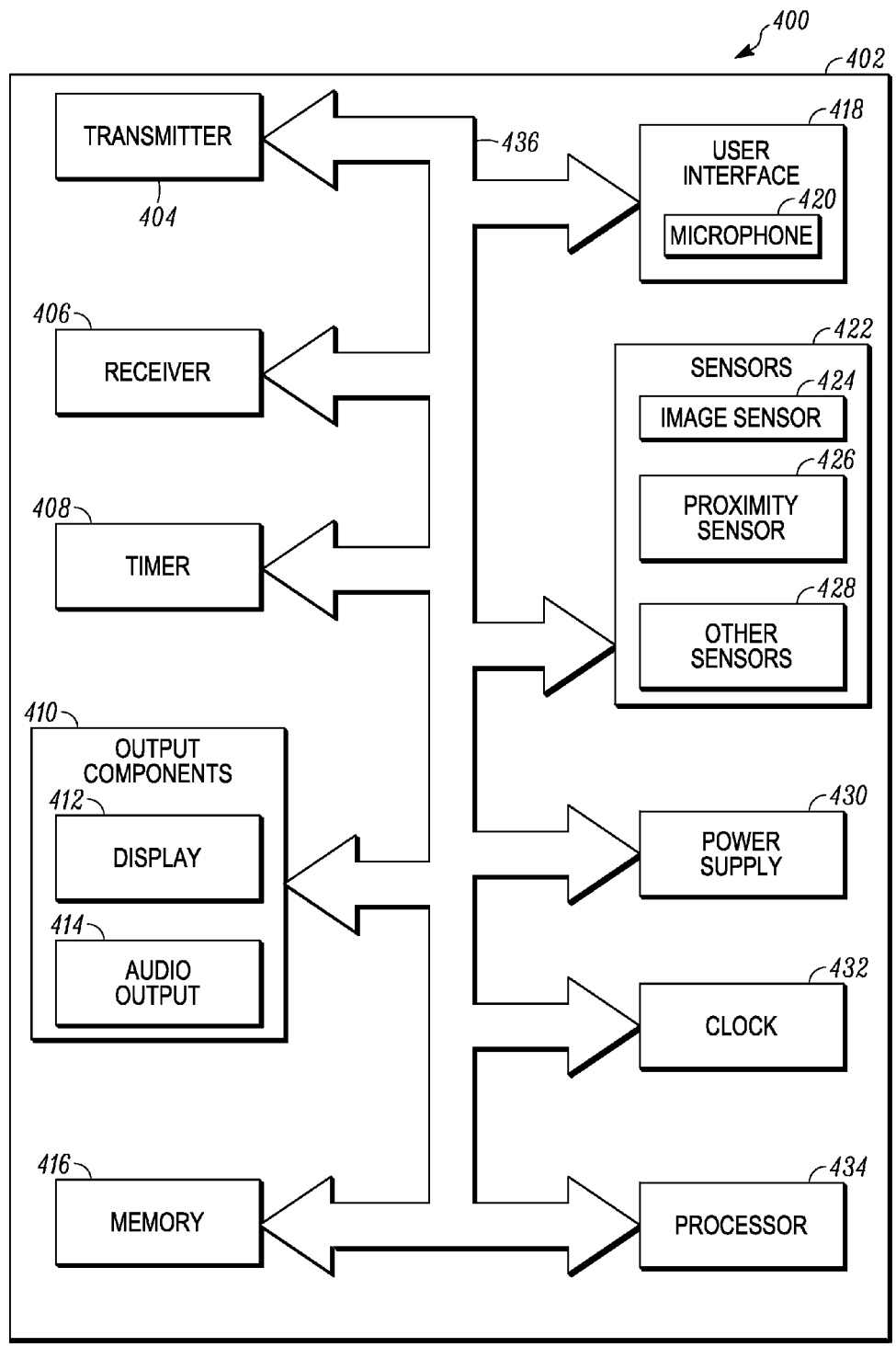
FIG. 4 is a block diagram showing internal components of an electronic device in accordance with some embodiments of the present invention.

Referring to FIG. 4, there is provided a block diagram 400 illustrating example internal hardware components of the electronic device 402. The electronic device 402 may represent the electronic device 102 of FIG. 1 or the electronic device 300 of FIG. 3. The block diagram 400 of the electronic device 402 includes various components. The exemplary components may include one or more transmitters 404, one or more receivers 406, a timer 408, one or more output components 410, a memory 416, one or more input components or user interfaces 418, one or more sensors 422, a power supply 430, a clock 432, and/or a processor 434, each capable of communicating with one or more components of the electronic device 402. For example, as shown in FIG. 4, all components may be coupled to a bidirectional control and data bus 436, but it is to be understood that the various components may be interconnected by any type of direct or indirect link capable of communicating control and/or data signals. The output component or components 410 may include a display 412, audio output 414, and the like. The user interface 418 may include a microphone 420 and/or other input components. The sensor or sensors 422 may include an image sensor 424, proximity sensor 426, and/or other sensors 428.

In accordance with an embodiment, the transmitter 404 can be implemented as a transmitting component of the electronic device 402. The transmitter 404 enables the electronic device 402 to transmit the RF signals through an antenna (not shown). Similarly, the receiver 406 may be implemented as a receiving component of the electronic device 402. The receiver 406 enables the electronic device 402 to receive the RF signals through an antenna (not shown). In accordance with the embodiment, the receiver 406 converts the RF signals received from the antenna to digital data for use by the processor 434. Further, the technologies described above regarding the communication capabilities of the electronic device 102 may be provided by the transmitter(s) and receiver(s) of FIG. 4.

In accordance with the embodiment, one or more output components 410 may generate visual indications of data generated during operation of the processor 434. The visual indications may include prompts for human operator input, calculated values, detected data, etc. Additionally, the one or more output components 410 may include a video output component such as a display 412 liquid crystal display, plasma display, front or rear projection display, and light emitting diode indicator. Other examples of the output components 410 include an audio output 414 which may include a speaker, alarm and/or buzzer, and/or a mechanical output component such as vibrating or motion-based.

Further, the memory 416 may be used to store data and instructions for the operation of the processor 434. In the various embodiments, the memory 416 may be one or more separate components and/or may be partitioned in various ways for various purposes such as but not limited to, optimizing memory allocations, etc. Thus it is to be understood that the exemplary memory 416 illustrated in FIG. 4 are for illustrative purposes only, for the purpose of explaining and assisting one of ordinary skill in understanding the various embodiments described herein.

In accordance with the embodiment, one or more the user interface 418 may be connected to the processor 434 for entering data and commands in the form of text, touch input, gestures, etc. The user interface 418 is, in one embodiment, a touch screen device but may alternatively be an infrared proximity detector or any input/output device combination capable of sensing gestures and/or touch including a touch-sensitive surface. Further, the one or more user interface 418 may include an audio input component such as microphone 420. In addition, the one or more user interface 418 may include one or more additional components, such as a video input component such as an optical sensor (for example, a camera), a mechanical input component such as button or key selection sensors, touch pad sensor, another touch-sensitive sensor, capacitive sensor, motion sensor, and may include a pointing device such as a joystick and buttons used on laptop or notebook computers, a track ball, a touch pad, a rocker switch, a touch screen, a TTY input device for disable persons, a Braille key input, or a pad for handwriting pen, for example. The one or more user interface 418 enables a user of the electronic device 402 to provide an input for the electronic device 402.

Still referring to FIG. 4, the electronic device 402 may include one or more sensors 422 which may include, for example, image sensor 424, proximity sensor 426, and other sensors 428. The image sensor 424 converts an optical image into an electronic signal. The image sensor 424 may include video camera tubes, charge-coupled device (CCD) or complementary metal-oxide-semiconductor (CMOS) active pixel sensors. The proximity sensor 426 may include, for example, a light detecting sensor, an ultrasound transceiver or an infrared transceiver. Other sensors 428 may include motion sensor (e.g., an accelerometer, a Gyroscope (Gyro), a Global Positioning system (GPS), a compass, an imager, acoustical, or a context sensor), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface of the electronic device 402. While the sensors 422 for the purposes of FIG. 4 are considered to be distinct from the user interface 418, in other embodiments it is possible that one or more of the input devices or user interfaces 418 can also be considered to constitute one or more of the sensors 422 (and vice-versa).

Further, the power supply 430, such as a battery, may be included in the internal components of the electronic device 402 for providing power to the other internal components and, for some embodiments, enable the electronic device 402 to be portable.

Further, the processor 434 operates in conjunction with the data and instructions stored in the memory 416 to control the operation of the electronic device 402. The processor 434 may be implemented as a microcontroller, a digital signal processor, hard-wired logic and analog circuitry, or any suitable combination of these. Also, the processor 434 may provide a variety of other functions, such as one or more timing functions. Of course, not all functions need to be performed by the processor 434, and the electronic device 402 may include components separate from the processor 434, such as a timer 408, clock 432 to provide those functions.

It is to be understood that FIG. 4 is for illustrative purposes only and is primarily for, although not solely for, explaining the information stored in memory for the various embodiments of an electronic device in accordance with the present disclosure, and is not intended to be a complete schematic diagram of the various components and connections there between required for an electronic device. Therefore, an electronic device 402 will comprise various other components not shown in FIG. 4, and/or have various other configurations internal and external, and still be within the scope of the present disclosure. Also, one or more of these components may be combined or integrated in a common component, or components features may be distributed among multiple components. Also, the components of the electronic device 402 may be connected differently, without departing from the scope of the invention.

Figure 5:
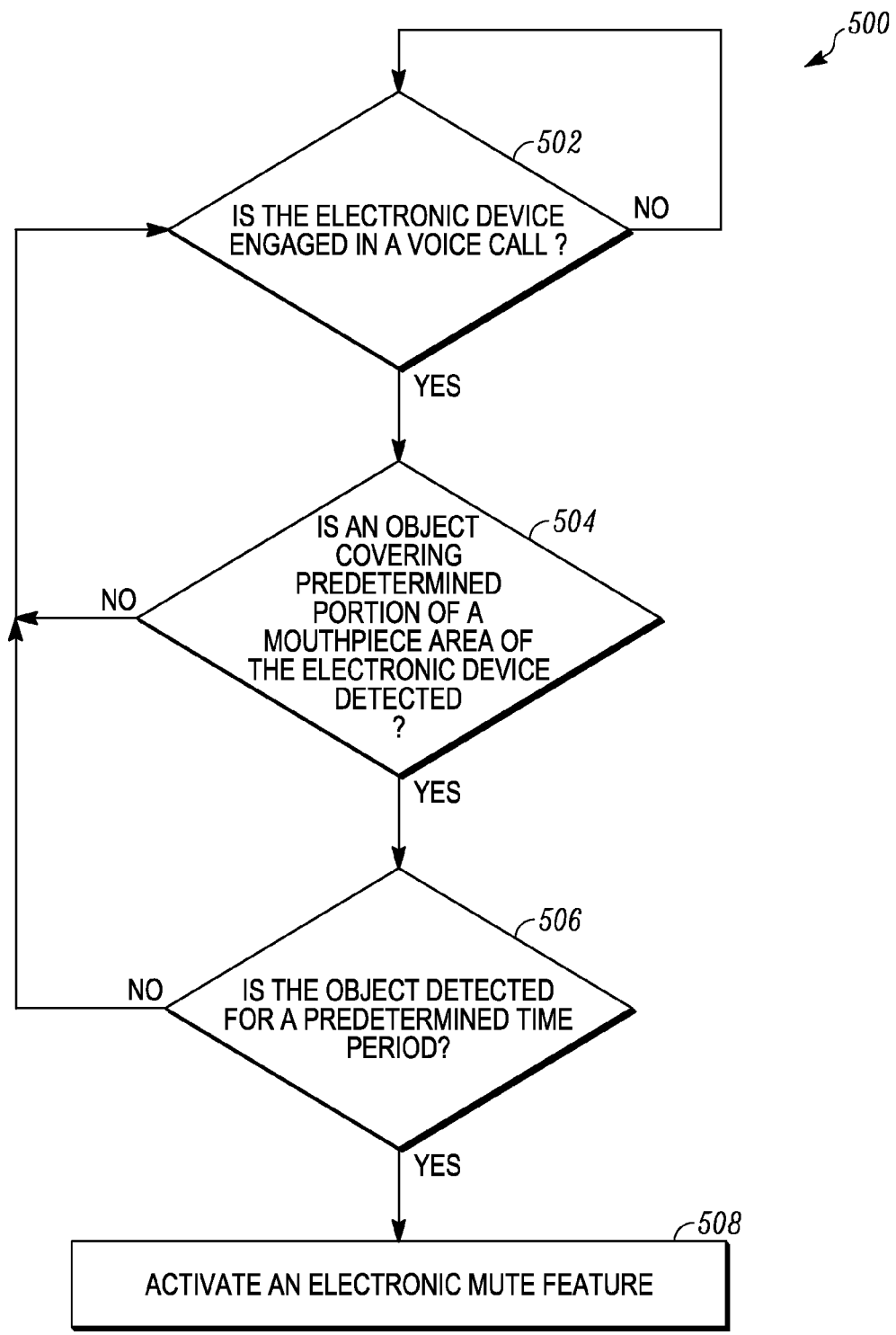
FIG. 5 is a flowchart depicting a method for controlling an electronic device in accordance with some embodiments of the present invention.

FIG. 5 is a flowchart of a method 500 for controlling the electronic device 402. Referring to FIG. 5, the method 500 starts at step 502. In accordance with an embodiment, the processor 434 of the electronic device 402 determines 502 if the electronic device 402 is engaged in a voice call. If the processor 434 determines 502 that the electronic device 402 is engaged in the voice call, the processor 434 moves to a step of determining 504 if an object covering at least a predetermined portion of a mouthpiece area of the electronic device 402 is detected by one or more sensors 422 of the electronic device 402 while the electronic device 402 is engaged in the voice call.

In one example, the mouthpiece area may refer to an area around a front surface of a microphone 420 of the electronic device 402. Further, an object may refer to a user's hand that forms a shape of a cup to cover the predetermined portion of the mouthpiece area or any object that may cover the predetermined portion of the mouthpiece area of the electronic device 402. In accordance with an embodiment, the predetermined portion may include entire front surface of the electronic device 402 as shown in FIG. 2. For example, the sensors 422 may determine that the front surface of the electronic device 402 is substantially covered in its entirety. In accordance with another embodiment, the predetermined portion may include at least some part of the mouthpiece area of the electronic device 402 as shown in FIG. 3. Further, the sensors 422 may detect at least one object adjacent to the mouthpiece area of the electronic device 402.

In accordance with one embodiment, the sensors 422 may detect an approaching object towards the mouthpiece area of the electronic device 402 prior to the detection of the object that covers the at least predetermined portion of the mouthpiece area of the electronic device 402. In accordance with the embodiment, the sensors 422 may determine a context of the electronic device 402. For example, the sensors 422 may determine an environmental condition, lighting condition, time of day, weather, background, location, and hand gesture associated with the electronic device 402.

In accordance with another embodiment, a signal from the microphone 420 may also be used to determine if an object is blocking the electronic device 402. For example, the processor 434 monitors the signal from the microphone 420 and creates an average of the microphone signal. If the signal falls below a predetermined average for a predetermined period of time then the processor 434 may assume that the microphone 420 is blocked. The predetermined average and the predetermined period of time may be defined by a user or manufacturer of the electronic device 402 and may be stored in the memory 416.

In accordance with yet another embodiment, a signal from the audio output 414 may be used to determine if an object is blocking the electronic device 402. An air cavity around an audio output, for example, a speaker, may be a part of the speaker response. For example, the processor 434 may monitor the signals from the audio output 414 and then determine the impedance of the audio output 414 by dividing a voltage of the signal by the current of the signal or by some other means. The impedance of the audio output 414 with and/or without a cupped hand blocking the electronic device 402 may be determined a priori. If the impedance during operation approximately equals the priori determined impedance with a cupped hand blocking, then the processor 434 may determine that the cupped hand is blocking the electronic device 402. This may be applicable in case of wearable device 102 when the various components of the electronic 102 may not be located by the user and the user covers the entire electronic device 102. In such case, the audio output 414 may also be covered and the signal from the audio output 414 may be used to determine if there is a blocking.

If the processor 434 at the step 502 determines that the electronic device 402 is not engaged in the voice call, the method 500 loops back to the step 502.

Further, if at the step 504, the processor 434 determines that the object covering at least a predetermined portion of a mouthpiece area of the electronic device 402 is detected by the sensors 422, the method 500 moves to a step of determining 506, by the timer 408, a time period for which the object is detected. The method 500 then moves to a step of determining 508, by the processor 434, if the detected time period is above a predetermined threshold value. The predetermined threshold value may be a value of a time set by a user or a manufacturer and may be stored in a memory 416 associated with the electronic device 402.

On the other hand, if the processor 434 determines that the object covering at least the predetermined portion of the mouthpiece area is not detected, the method 500 moves back to the step of determining 502 if the electronic device 402 is engaged in a voice call.

Further, if at the step 506, the processor 434 determines that the object covers at least a predetermined portion of the mouthpiece area of the electronic device 402 for the predetermined time period, the method 500 then moves to a step of activating 508 an electronic mute feature of the electronic device 402 while the object covers the at least predetermined portion of the mouthpiece area of the electronic device 402. In one example, the microphone 420 is momentarily disabled while the electronic mute feature is activated.

On the other hand, if the processor 434 determines 506 that the object is not detected for a predetermined time period, the method 500 moves to the step of determining 500 if the electronic device 402 is engaged in the voice call.

Therefore, in accordance with the embodiments of the present invention, when an electronic device is engaged in a voice call and an object covering at least a predetermined portion of the mouthpiece area of the electronic device for a predetermined time period is detected, the microphone of the electronic device is momentarily disabled, thus activating the electronic mute feature of the electronic device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, and/or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of an electronic device for controlling the electronic device, the method comprising:
   determining that the electronic device is engaged in a voice call;
   detecting at least one object that covers at least a predetermined portion of a mouthpiece area of the electronic device while the electronic device is engaged in the voice call, wherein detecting the at least one object includes detecting that a front surface of the electronic device is substantially covered in its entirety; and
   activating an electronic mute feature of the electronic device in response to detecting the at least one object.

2. The method of claim 1, wherein detecting at least one object that covers at least a predetermined portion of the mouthpiece area of the electronic device further comprises detecting the at least one object adjacent to the mouthpiece area of the electronic device.

3. The method of claim 1, wherein detecting at least one object that covers at least a predetermined portion of a mouthpiece area of the electronic device further comprises detecting the at least one object for at least a predetermined time period.

4. The method of claim 1, wherein activating an electronic mute feature of the electronic device in response to detecting the at least one object further comprises activating the electronic mute feature while the at least one object covers the at least predetermined portion of the mouthpiece area of the electronic device.

5. The method of claim 1, wherein activating an electronic mute feature of the electronic device in response to detecting the at least one object further comprises momentarily disabling a microphone associated with the electronic device.

6. The method of claim 1, wherein the at least one object is a cupped hand.

7. The method of claim 1, wherein the electronic device is a wearable device.

8. A method of an electronic device for controlling the electronic device, the method comprising:
   determining that the electronic device is engaged in a voice call;
   detecting at least one object that covers at least a predetermined portion of a mouthpiece area of the electronic device while the electronic device is engaged in the voice call, wherein detecting the at least one object further comprises determining a context of the electronic device including at least one of an environmental condition, lighting condition, time of day, weather, background, location, or hand gesture associated with the electronic device; and
   activating an electronic mute feature of the electronic device in response to detecting the at least one object.

9. A method of an electronic device for controlling the electronic device, the method comprising:
   determining that the electronic device is engaged in a voice call;
   detecting at least one object that covers at least a predetermined portion of a mouthpiece area of the electronic device while the electronic device is engaged in the voice call;
   detecting at least one approaching object towards the mouthpiece area of the electronic device prior to the detection of the at least one object that covers the at least predetermined portion of the mouthpiece area of the electronic device; and
   activating an electronic mute feature of the electronic device in response to detecting the at least one object.

10. An electronic device for managing a call feature, the electronic device comprising:
    a processor configured to detect that the electronic device is engaged in a voice call;
    a first sensor configured to detect at least one object that covers at least a predetermined portion of a mouthpiece area of the electronic device, wherein the first sensor is configured to detect that a front surface of the electronic device is substantially covered in its entirety; and
    the processor further configured to activate an electronic mute feature of the electronic device based upon detecting the at least one object.

11. The electronic device of claim 10, wherein a first sensor configured to detect at least one object that covers at least a predetermined portion of a mouthpiece area of the electronic device comprises detecting the at least one object adjacent to the electronic device.

12. The electronic device of claim 10, wherein the processor is further configured to activate an electronic mute feature of the electronic device further comprises activating the electronic mute feature while the at least one object covers the at least predetermined portion of the mouthpiece area of the electronic device.

13. The electronic device of claim 10, further comprising:
    a microphone, wherein the microphone is momentarily disabled while the electronic mute feature is activated.

14. An electronic device for managing a call feature, the electronic device comprising:
    a processor configured to detect that the electronic device is engaged in a voice call;
    a first sensor configured to detect at least one object that covers at least a predetermined portion of a mouthpiece area of the electronic device;
    a second sensor to determine a context of the electronic device, wherein the context of the electronic device includes at least one of an environmental condition, lighting condition, time of day, weather, background, location, or hand gesture associated with the electronic device; and
    the processor further configured to activate an electronic mute feature of the electronic device based upon detecting the at least one object.

15. An electronic device for managing a call feature, the electronic device comprising:
    a processor configured to detect that the electronic device is engaged in a voice call;
    a first sensor configured to detect at least one object that covers at least a predetermined portion of a mouthpiece area of the electronic device;
    a second sensor configured to detect at least one approaching object towards the mouthpiece area of the electronic device prior to the detection of the at least one object that covers the at least predetermined portion of the mouthpiece area of the electronic device; and
    the processor further configured to activate an electronic mute feature of the electronic device based upon detecting the at least one object.

16. An electronic device for managing a call feature, the electronic device comprising:
    a processor configured to detect that the electronic device is engaged in a voice call;
    a first sensor configured to detect at least one object that covers at least a predetermined portion of a mouthpiece area of the electronic device; and
    a timer configured to determine a time period for which the at least one object covers the at least predetermined portion of the mouthpiece area of the electronic device, wherein the processor is further configured to activate an electronic mute feature of the electronic device based upon detecting the at least one object, and the processor is further configured to activate the electronic mute feature of the electronic device when the determined time period is above a predetermined threshold value.

\* \* \* \* \*